US008801419B1

(12) United States Patent
Oskirka

(10) Patent No.: US 8,801,419 B1
(45) Date of Patent: Aug. 12, 2014

(54) CAKE DECORATION MOLD ASSEMBLY

(71) Applicant: Ramona Oskirka, Acworth, GA (US)

(72) Inventor: Ramona Oskirka, Acworth, GA (US)

( * ) Notice: Subject to any disclaimer, the term of this patent is extended or adjusted under 35 U.S.C. 154(b) by 120 days.

(21) Appl. No.: 13/644,193

(22) Filed: Oct. 3, 2012

(51) Int. Cl.
*A23P 1/00* (2006.01)

(52) U.S. Cl.
USPC ........... 425/182; 211/123; 211/170; 211/195; 425/290; 425/363; 425/446; 425/472

(58) Field of Classification Search
USPC ............. 425/182, 290, 324.1, 363, 383, 385, 425/446, 472; 211/85, 85.17, 85.4, 104, 211/106.01, 123, 170, 195, 206
See application file for complete search history.

(56) References Cited

U.S. PATENT DOCUMENTS

| | | | |
|---|---|---|---|
| 2,099,286 A * | 11/1937 | Usbeck | 30/306 |
| 2,132,690 A | 10/1938 | Hilliard | |
| 2,928,533 A | 3/1960 | Loucony | |
| 6,432,461 B1 | 8/2002 | Dixon | |
| D516,858 S | 3/2006 | Henry et al. | |
| 8,172,099 B1 * | 5/2012 | Hardy | 211/195 |
| 2004/0022905 A1 | 2/2004 | Verba | |
| 2008/0237168 A1 * | 10/2008 | Harpole | 211/195 |
| 2010/0080871 A1 | 4/2010 | Doty | |

* cited by examiner

*Primary Examiner* — Robert B Davis

(57) ABSTRACT

A cake decoration mold assembly includes a collapsible housing that has a bottom wall and a perimeter wall coupled to and extending upwardly from a perimeter edge of the bottom wall. A shaft is positioned on a top edge of the perimeter wall of the collapsible housing such that the shaft extends between a first lateral side and a second lateral side of the perimeter wall of the collapsible housing. The shaft has a shaped cake decoration positioned on the shaft so the shaft may dry the shaped cake decoration. A roller is rollable over the cake decoration so the roller may flatten the cake decoration. A hook may be selectively coupled to the collapsible housing.

17 Claims, 7 Drawing Sheets

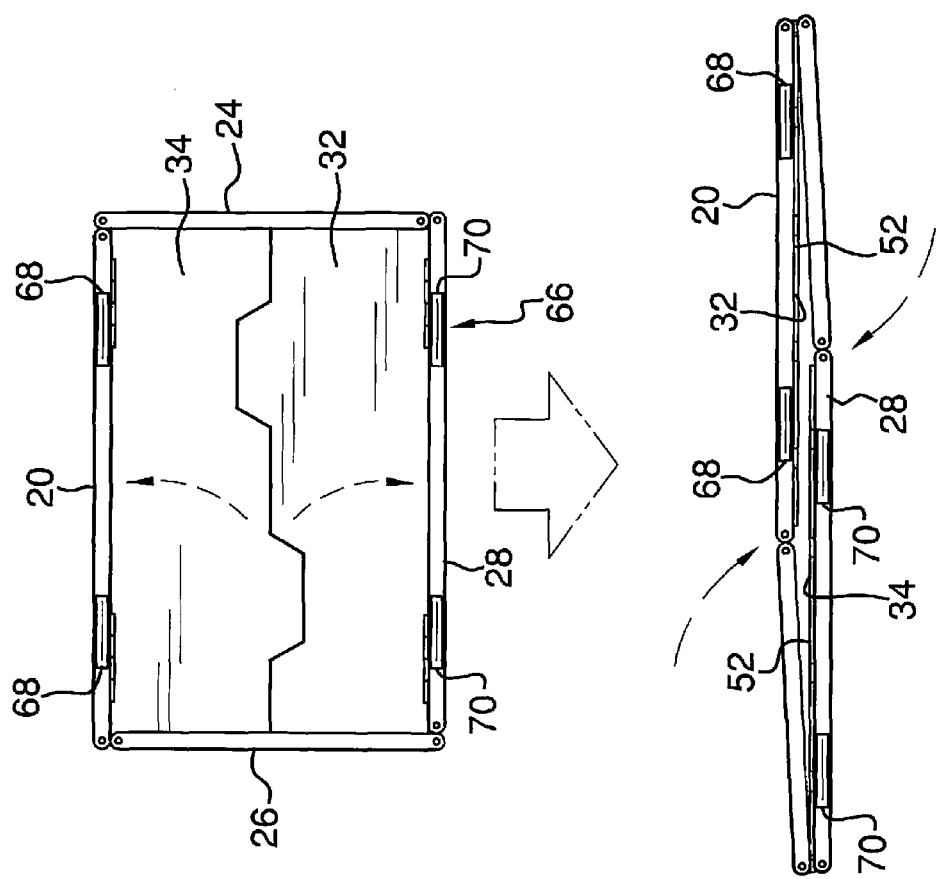

CAKE DECORATION MOLD ASSEMBLY

BACKGROUND OF THE DISCLOSURE

Field of the Disclosure

The disclosure relates to cake decoration mold devices and more particularly pertains to a new cake decoration mold device for drying cake decorations.

SUMMARY OF THE DISCLOSURE

An embodiment of the disclosure meets the needs presented above by generally comprising a collapsible housing that has a bottom wall and a perimeter wall coupled to and extending upwardly from a perimeter edge of the bottom wall. A shaft is positioned on a top edge of the perimeter wall of the collapsible housing such that the shaft extends between a first lateral side and a second lateral side of the perimeter wall of the collapsible housing. The shaft has a shaped cake decoration positioned on the shaft so the shaft may dry the shaped cake decoration. A roller is rollable over the cake decoration so the roller may flatten the cake decoration. A hook may be selectively coupled to the collapsible housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 8 is a bottom perspective view of an embodiment of the disclosure.

DESCRIPTION OF THE PREFERRED EMBODIMENT

Figure 1:
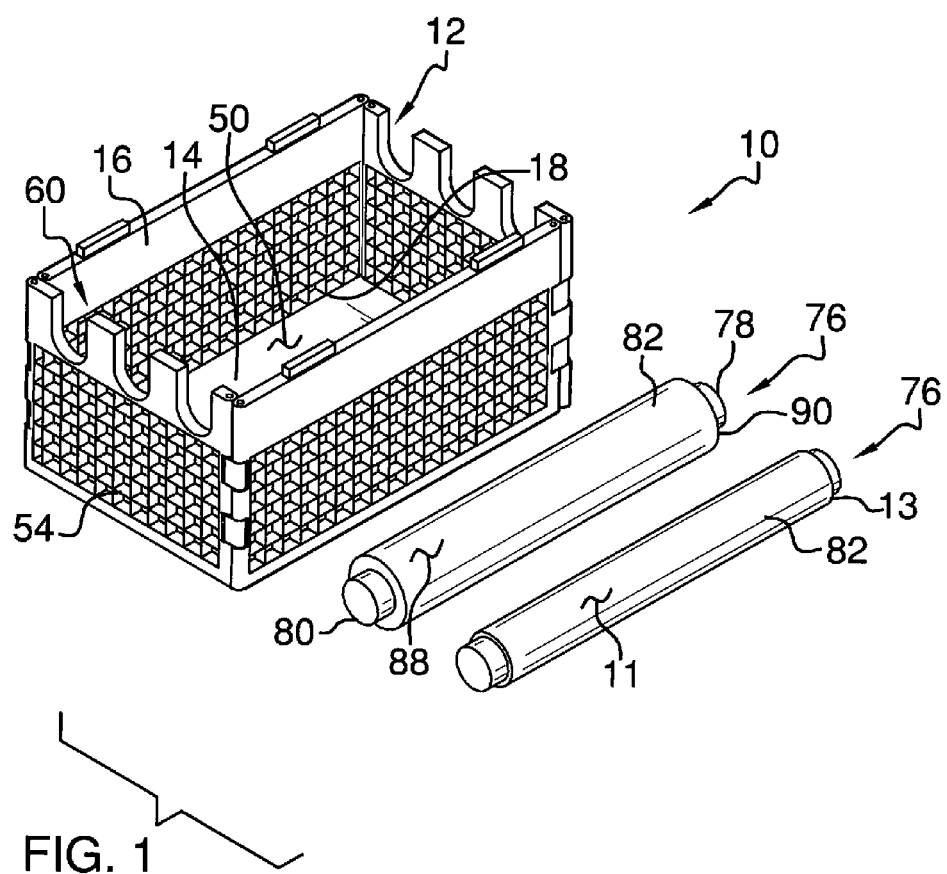
FIG. 1 is a perspective view of a cake decoration mold assembly according to an embodiment of the disclosure.
Figure 2:
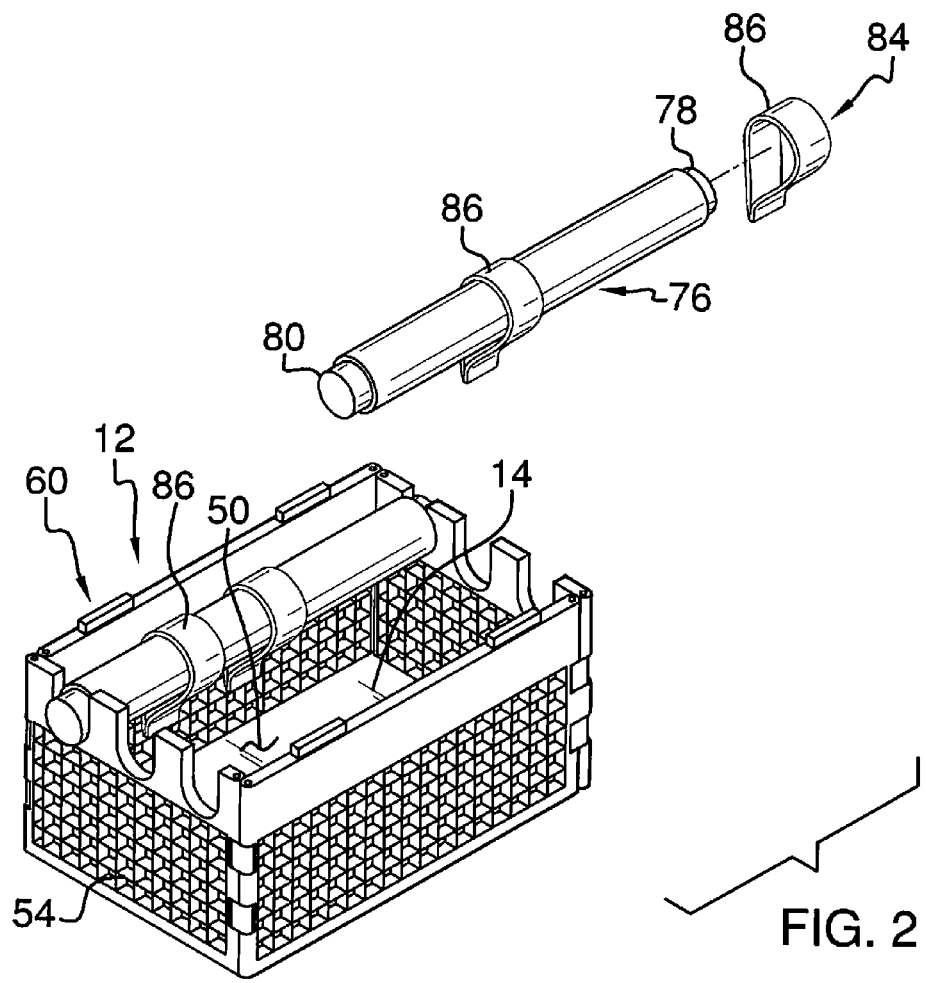
FIG. 2 is a top perspective view of an embodiment of the disclosure.
Figure 3:
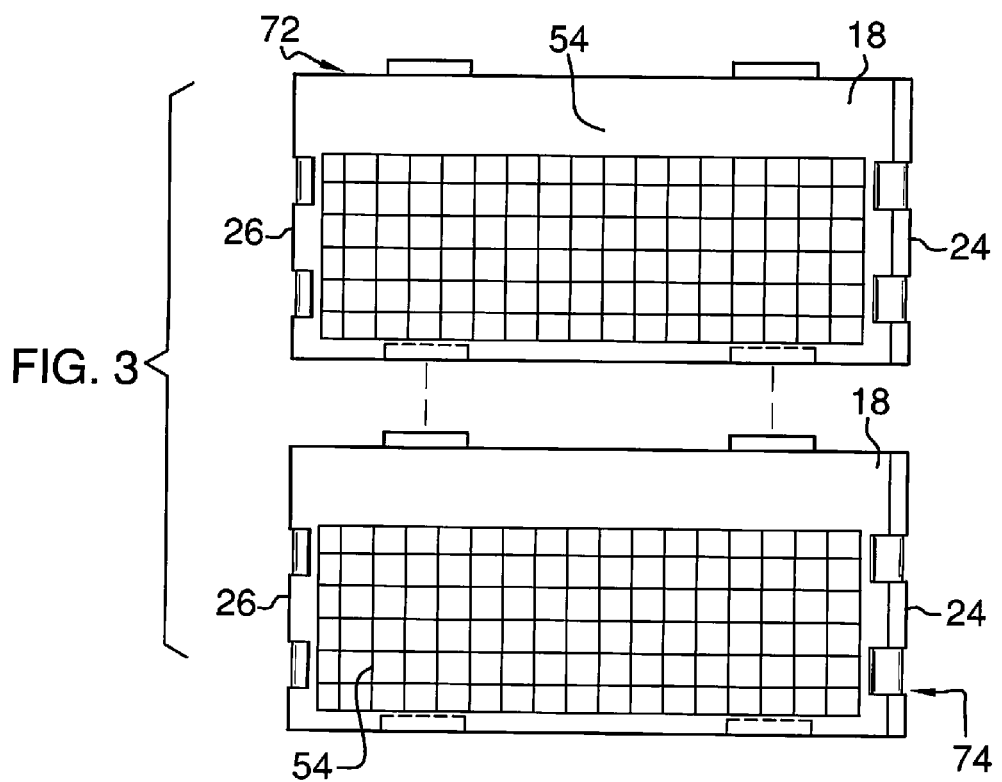
FIG. 3 is a right side view of an embodiment of the disclosure.
Figure 4:
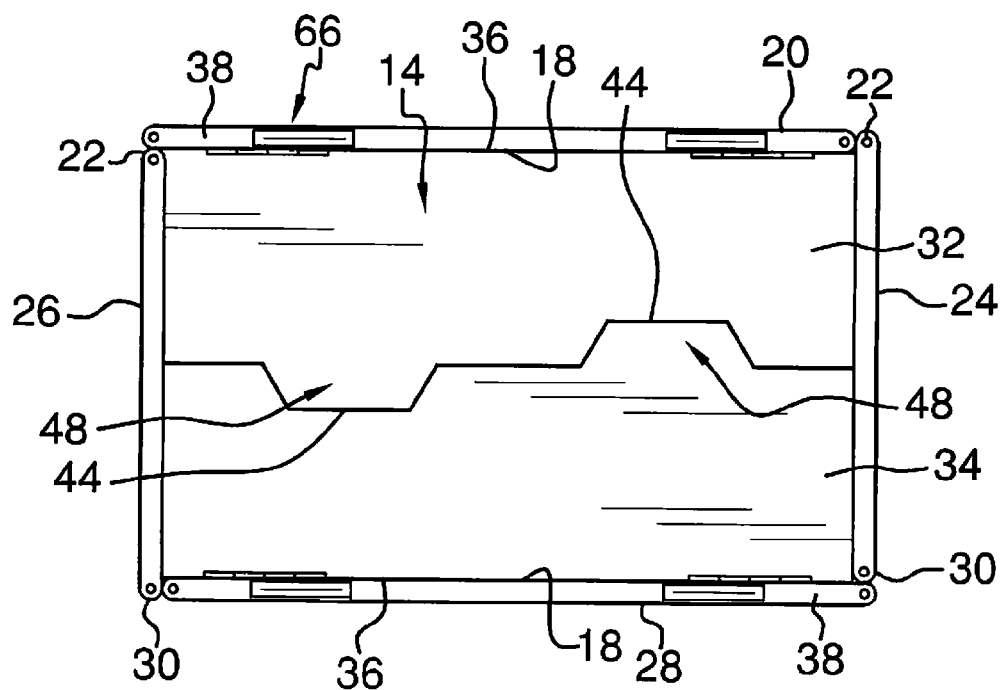
FIG. 4 is a bottom view of an embodiment of the disclosure.
Figure 5:
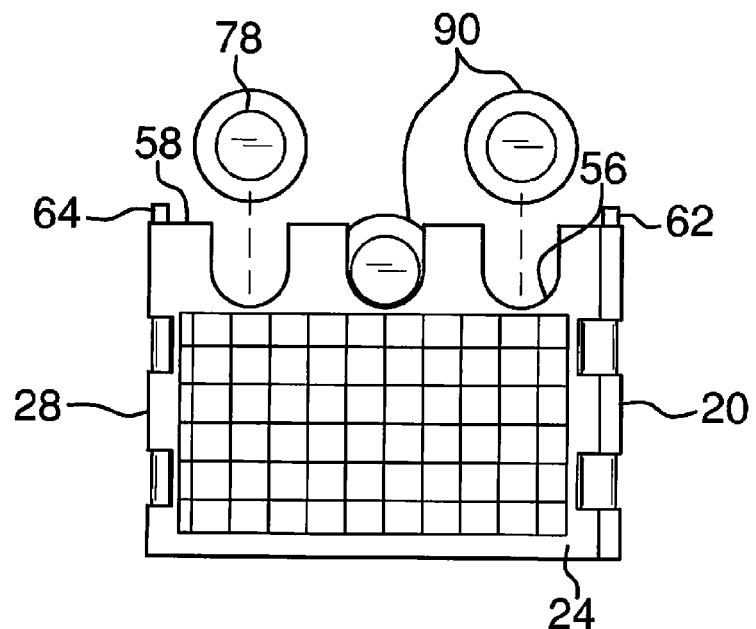
FIG. 5 is a front view of an embodiment of the disclosure.
Figure 6:
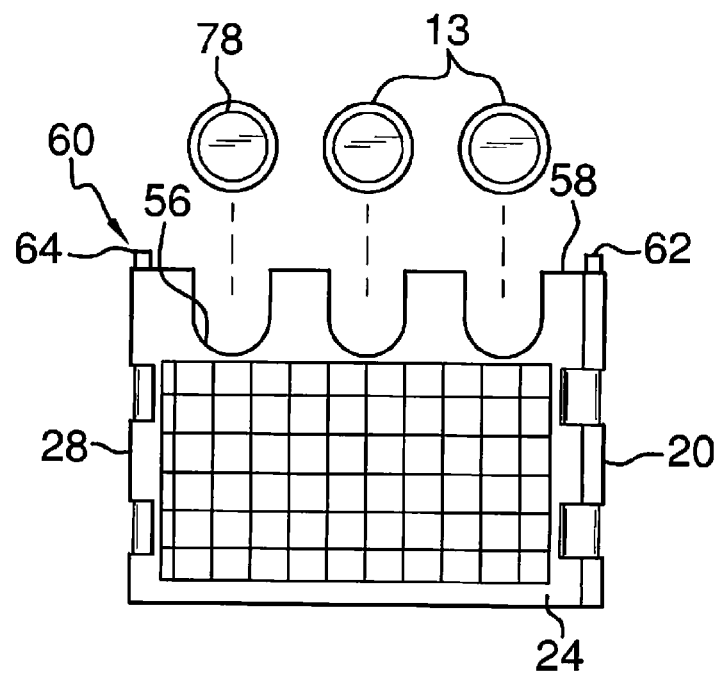
FIG. 6 is a back view of an embodiment of the disclosure.
Figure 7:
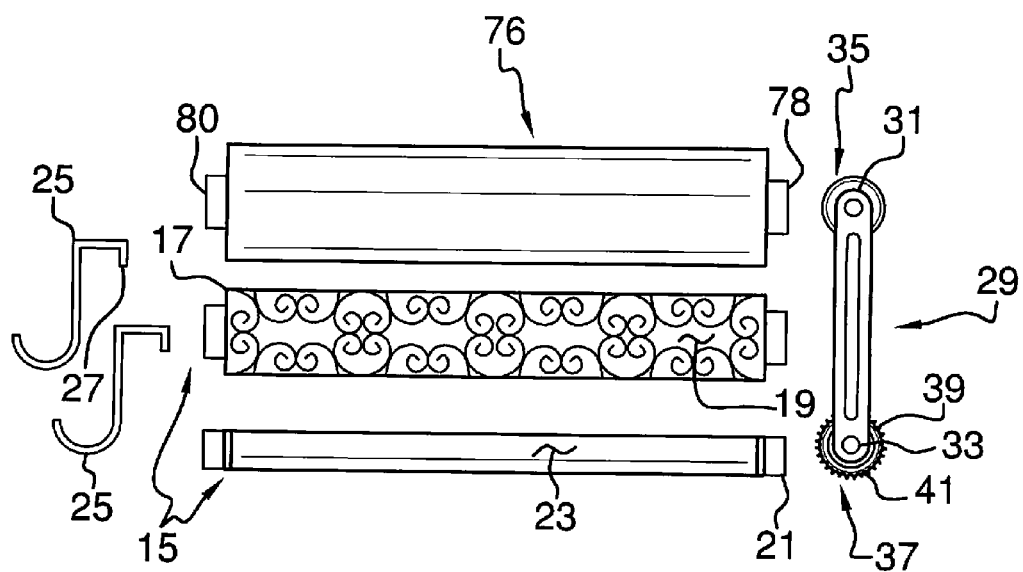
FIG. 7 is a top view of an embodiment of the disclosure.

With reference now to the drawings, and in particular to FIGS. 1 through 8 thereof, a new cake decoration mold device embodying the principles and concepts of an embodiment of the disclosure and generally designated by the reference numeral 10 will be described.

As best illustrated in FIGS. 1 through 8, the cake decoration mold assembly 10 generally comprises a collapsible housing 12 that has a bottom wall 14 and a perimeter wall 16 coupled to and extending upwardly from a perimeter edge 18 of the bottom wall 14. The perimeter wall 16 of the collapsible housing 12 has a front side 20 that is hingedly coupled to and extends between a front edge 22 of each of a first lateral side 24 and a second lateral side 26 of the perimeter wall 16 of the collapsible housing 12. The perimeter wall 16 of the collapsible housing 12 has a back side 28 that is hingedly coupled to and extends between a back edge 30 of each of the first lateral 24 and the second lateral 26 sides of the perimeter wall 16 of the collapsible housing 12. The collapsible housing 12 may have a length between 40 cm and 45 cm and a width between 25 cm and 30 cm. The collapsible housing 12 may have a height between 10 cm and 15 cm.

The bottom wall 14 of the collapsible housing 12 has a first portion 32 and a second portion 34. A coupled edge 36 of the first portion 32 of the bottom wall 14 is hingedly coupled to a bottom edge 38 of the front side 20 of the perimeter wall 16 of the collapsible housing 12. A coupled edge 36 of the second portion 34 of the bottom wall 14 is hingedly coupled to the bottom edge 38 of the back side 28 of the perimeter wall 16 of the collapsible housing 12. The first 32 and second 34 portions of the bottom wall 14 of the collapsible housing 12 are positionable in a closed position that has a free edge 44 of the first portion 32 of the bottom wall 14 of the collapsible housing 12 abutting a free edge 44 of the second portion 34 of the bottom wall 14 of the collapsible housing 12.

A tab 48 extends away from the free edge 44 of each of the first 32 and second 34 portions. Each of the tabs 48 engages the free edge 44 of an associated one of the first 32 and second 34 portions to retain the bottom wall 14 in the closed position. Each of the first 32 and second 34 portions of the bottom wall 14 of the collapsible housing 12 extends inwardly away from an associated one of the front 20 and back sides 28 of the perimeter wall 16 of the collapsible housing 12 in the closed position. The first 32 and second 34 portions of the bottom wall 14 of the collapsible housing 12 are positionable in an open position such that an upper surface 50 of each of the first 32 and second portions 34 of the bottom wall 14 of the collapsible housing 12 abuts an inside surface 52 of an associated one of the front 20 and back 28 sides of the perimeter wall 16 of the collapsible housing 12.

The perimeter wall 16 of the collapsible housing 12 is positionable in a collapsed position after the first 32 and second 34 portions of the bottom wall 14 of the collapsible housing 12 are positioned in the open position. The inside surface 52 of each of the front 20, back 28, first lateral 24 and second lateral 26 sides of the perimeter wall 16 of the collapsible housing 12 are positioned proximal to each other when the perimeter wall 16 is positioned in the collapsed position so the collapsible housing 12 may be collapsed.

The perimeter wall 16 of the collapsible housing has a plurality of perforations 54 extending therethrough so the perimeter wall 16 of the collapsible housing 12 may allow air to flow through the collapsible housing 12. A plurality of spaced grooves 56 extends downwardly from a top edge 58 of each of the first 24 and second 26 lateral sides of the perimeter wall 16 of the collapsible housing 12. The spaced grooves 56 are spaced laterally apart from each other along the top edge 58 of each of the first 24 and second 26 lateral sides of the perimeter wall 16 of the collapsible housing 12. The spaced grooves 56 may each have a semicircular shape at a bottom of the spaced groove 56. Each spaced groove 56 is deep enough such that.

A tab 60 is coupled to and extends upwardly from the top edge 58 of the perimeter wall 16. The tab 60 is one of a plurality of tabs. The plurality of tabs 60 comprises a pair of sets of the tabs 60. A first set of the tabs 62 is coupled to and extends upwardly from the top edge 58 of the front side 20 of the perimeter wall 16 of the collapsible housing 12 proximal an associated one of the first 24 and second 26 lateral sides the perimeter wall 16 of the collapsible housing 12. A second set of the tabs 64 is coupled to and extends upwardly from the top edge 58 of the back side 28 of the perimeter wall 16 of the collapsible housing 12 proximal an associated one of the first 24 and second 26 lateral sides of the perimeter wall 16 of the collapsible housing 12. The tabs 60 may each extend upwardly from the top edge 58 of the perimeter wall 16 a distance between 5 cm and 7.5 cm.

A slot 66 extends upwardly into the bottom edge 38 of the perimeter wall 16 of the collapsible housing 12. The slot 66 is one of a plurality of slots 66. The plurality of slots 66 comprises a pair of sets of the slots 66. A first set of the slots 68 extends upwardly into the bottom edge 38 of the front side 20 of the perimeter wall 16 of the collapsible housing 12 proximal an associated one of the first 24 and second 26 lateral sides of the perimeter wall 16 of the collapsible housing 12. A second set of the slots 70 extends upwardly into the bottom edge 38 of the back side 28 of the perimeter wall 16 of the collapsible housing 12 proximal an associated one of the first 24 and second 26 lateral sides of the perimeter wall 16 of the collapsible housing 12. The slots 66 may each have a depth between 1.5 cm and 4 cm.

The collapsible housing 12 is one of a pair of collapsible housings 12. A second one of the collapsible housings 72 is positionable on a top of a first one of the collapsible housings 74. The plurality of slots 66 in the second collapsible housing 72 insertably receives an associated one of the plurality of tabs 60 of the first collapsible housing 74 so the first 74 and second 72 collapsible housings may be vertically stacked.

A shaft 76 has a first end 78 and a second end 80. Each of the first 78 and second 80 ends has a diameter is less than a diameter of a middle portion 82 of the shaft 76. The shaft 76 is positionable in the collapsible housing 12 so each of the first 78 and second 80 ends is positioned within an associated one of the spaced grooves 56 in the first 24 and second 26 lateral sides of the perimeter wall 16 of the collapsible housing 12. The shaft 76 extends between the first 24 and second 26 lateral sides of the perimeter wall 16 of the collapsible housing 12 when the shaft 76 is positioned in the housing. The shaft 76 may have a length between 42 cm and 47 cm.

The shaft 76 may have a shaped cake decoration 84 positioned on the shaft 76 so the shaft 76 may dry the shaped cake decoration 84. The shaped cake decoration 84 may comprise a fondant bow 86. The shaft 76 may retain the fondant bow 86 in a circular shape to be dried. The shaft 76 is one of a plurality of shafts 76. The plurality of shafts 76 comprises a pair of sets of the shafts 76. An outer surface 88 of the middle portion 82 of a first set of the shafts 90 has a diameter is greater than a diameter of an outer surface 11 of the middle portion 82 of a second set of the shafts 13. The outer surface 88 of the first shaft 90 may have a diameter between 2.5 cm and 5 cm. The outer surface 11 of the second shaft 13 may have a diameter between 2 cm and 3.5 cm. The first 90 and second 13 sets of shafts may be used to dry differing sizes of fondant bows 86.

A roller 15 is one of a pair of rollers 15. A first one of the rollers 17 has a textured outer surface 19 so the first roller 17 may texture the cake decoration 84 when the first roller 17 is rolled across the cake decoration 84. The first roller 17 may have a diameter between 2 cm and 3 cm. A second one of the rollers 21 has a smooth outer surface 23 so the second roller 21 may flatten the cake decoration 84 when the second roller 21 is rolled over the cake decoration 84. The second roller 21 may have a diameter between 0.5 cm and 2 cm.

A hook 25 is selectively coupled to the collapsible housing 12. A coupling end 27 of the hook 25 is extended through a selected one of the perforations 54 so the hook 25 is retained on the collapsible housing 12. The hook 25 is one of a plurality of the hooks 25. Each of the plurality of hooks 25 insertably receives an associated one of a first end 78 and a second end 80 of the shaft 76 so the hooks 25 may store the shaft 76.

A marking tool 29 has a first end 31 and a second end 33. A first wheel 35 is rotatably coupled to the first end 33 of the marking tool 29. The first wheel 35 is rolled across the cake decoration 84 so the first wheel 35 may cut the cake decoration 84. The first wheel 35 may be comprised of a rigid material such as steel or other similar material. A second wheel 37 is rotatably coupled to the second end 33 of the marking tool 29. The second wheel 37 has a plurality of teeth 39 coupled to and extending away from an outer edge 41 of the second wheel 37. The plurality of teeth 39 is positioned around an entire circumference of the second wheel 37. The second wheel 37 is rolled across the cake decoration 84 so the second wheel 37 may perforate the cake decoration 84. The second wheel 37 may be comprised of a rigid material such as steel or other similar material.

In use, a selected one of the first 17 or second 21 rollers may be used to flatten the cake decoration 84. The first wheel 35 of the marking tool 29 may be used to cut the cake decoration 84. The cake decoration 84 may be shaped into the fondant bow 86. The fondant bow 86 may be positioned around a selected one of the first 90 or second 13 shaft to be dried. The first 90 or second 13 shaft may be positioned in the grooves 56 in the collapsible housing 12 to be stored while the fondant bow 86 dries. The depth of the spaced grooves 56 is sufficient to receive the first 90 or second 13 shafts without the first 90 or second 13 shafts extending upwardly over the top edge 58. Thus, multiple collapsible housings 12 may be stacked.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:
1. A cake decoration mold assembly comprising:
a collapsible housing having a bottom wall and a perimeter wall coupled to and extending upwardly from a perimeter edge of said bottom wall;
a shaft being positioned on a top edge of said perimeter wall of said collapsible housing such that said shaft extends between a first lateral side and a second lateral side of said perimeter wall of said collapsible housing, said shaft having a shaped cake decoration positioned on said shaft whereby said shaft is configured to dry the shaped cake decoration;
a roller being rollable over the cake decoration whereby said roller is configured to flatten the cake decoration; and a hook being selectively coupled to said collapsible housing.

2. The assembly according to claim 1, further including said bottom wall of said collapsible housing having a first portion and a second portion, a coupled edge of said first portion of said bottom wall being hingedly coupled to a bottom edge of a front side of said perimeter wall of said collapsible housing, a coupled edge of said second portion of said bottom wall being hingedly coupled to a bottom edge of a back side of said perimeter wall of said collapsible housing.

3. The assembly according to claim 1, further including said perimeter wall of said collapsible housing having a front side being hingedly coupled to and extending between a front edge of each of a first lateral side and a second lateral side of said perimeter wall of said collapsible housing, said perimeter wall of said collapsible housing having a back side being hingedly coupled to and extending between a back edge of each of said first lateral and said second lateral sides of said perimeter wall of said collapsible housing.

4. The assembly according to claim 2, further including said first and second portions of said bottom wall of said collapsible housing being positionable in a closed position having a free edge of said first portion of said bottom wall of said collapsible housing abutting a free edge of said second portion of said bottom wall of said collapsible housing such that each of said first and second portions of said bottom wall of said collapsible housing extends inwardly away from an associated one of said front and back sides of said perimeter wall of said collapsible housing, said first and second portions of said bottom wall of said collapsible housing being positionable in an open position such that an upper surface of each of said first and second portions of said bottom wall of said collapsible housing abuts an inside surface of an associated one of said front and back sides of said perimeter wall of said collapsible housing.

5. The assembly according to claim 3, further comprising:
said bottom wall of said collapsible housing having a first portion and a second portion;
said first and second portions of said bottom wall of said collapsible housing being positionable in an open position; and
said perimeter wall of said collapsible housing being positionable in a collapsed position after said first and second portions of said bottom wall of said collapsible housing are positioned in said open position, an inside surface of each of said front, back, first lateral and second lateral sides of said perimeter wall of said collapsible housing being positioned proximal to each other when said perimeter wall is positioned in said collapsed position whereby said collapsible housing is configured to be collapsed.

6. The assembly according to claim 1, further including said perimeter wall of said collapsible housing having a plurality of perforations extending therethrough whereby said perimeter wall of said collapsible housing is configured to allow air to flow through said collapsible housing.

7. The assembly according to claim 1, further including a plurality of spaced grooves extending downwardly from a top edge of each of said first and second lateral sides of said perimeter wall of said collapsible housing, said spaced grooves being spaced laterally apart from each other along said top edge of each of said first and second lateral sides of said perimeter wall of said collapsible housing.

8. The assembly according to claim 7, further including said shaft having a first end and a second end, each of said first and second ends having a diameter being less than a diameter of a middle portion of said shaft, said shaft being positionable in said collapsible housing having each of said first and second ends positioned within an associated one of said spaced grooves in said first and second lateral sides of said perimeter wall of said collapsible housing such that said shaft extends between said first and second lateral sides of said perimeter wall of said collapsible housing.

9. The assembly according to claim 8, further including said shaft being one of a plurality of shafts, said plurality of shafts comprising a pair of sets of said shafts, an outer surface of said middle portion of a first set of said shafts having a diameter being greater than a diameter of an outer surface of said middle portion of a second set of said shafts.

10. The assembly according to claim 1, further including said roller being one of a pair of rollers, a first one of said rollers having a textured outer surface whereby said first roller is configured to texture the cake decoration when said first roller is rolled across the cake decoration, a second one of said rollers having a smooth outer surface whereby said second roller is configured to flatten the cake decoration when said second roller is rolled over the cake decoration.

11. The assembly according to claim 1, further including a tab coupled to and extending upwardly from a top edge of said perimeter wall, said tab being one of a plurality of tabs, said plurality of tabs comprising a pair of sets of said tabs, a first set of said tabs being coupled to and extending upwardly from a top edge of a front side of said perimeter wall of said collapsible housing proximal an associated one of said first and second lateral sides said perimeter wall of said collapsible housing, a second set of said tabs being coupled to and extending upwardly from a top edge of a back side of said perimeter wall of said collapsible housing proximal an associated one of said first and second lateral sides of said perimeter wall of said collapsible housing.

12. The assembly according to claim 1, further comprising:
a tab coupled to and extending upwardly from a top edge of said perimeter wall, said tab being one of a plurality of tabs, said plurality of tabs comprising a pair of sets of said tabs; and
a slot extending upwardly into a bottom edge of said perimeter wall of said collapsible housing, said slot being one of a plurality of slots, said plurality of slots comprising a pair of sets of said slots, a first set of said slots extending upwardly into a bottom edge of a front side of said perimeter wall of said housing proximal an associated one of said first and second lateral sides of said perimeter wall of said collapsible housing, a second set of said slots extending upwardly into a bottom edge of a back side of said perimeter wall of said collapsible housing proximal an associated one of said first and second lateral sides of said perimeter wall of said collapsible housing.

13. The assembly according to claim 12, further including said collapsible housing being one of a pair of collapsible housings, a second one of said collapsible housings being positionable on a top of a first one of said collapsible housings such that said plurality of slots in said second collapsible housing insertably receives an associated one of said plurality of tabs of said first collapsible housing whereby said first and second collapsible housings are configured to be vertically stacked.

14. The assembly according to claim 1, further comprising:
said perimeter wall of said collapsible housing having a plurality of perforations extending therethrough; and
said hook being selectively coupled to said collapsible housing having a coupling end of said hook being extended through a selected one of said perforations whereby said hook is retained on said collapsible housing.

15. The assembly according to claim 1, further including said hook being one of a plurality of said hooks, each of said plurality of hooks insertably receiving an associated one of a first end and a second end of said shaft whereby said hooks are configured to store said shaft.

16. The assembly according to claim 1, further comprising:
   a marking tool having a first end and a second end;
   a first wheel rotatably coupled to said first end of said marking tool, said first wheel being rolled across the cake decoration whereby said first wheel is configured to cut the cake decoration; and
   a second wheel rotatably coupled to said second end of said marking tool, said second wheel having a plurality of teeth coupled to and extending away from an outer edge of said second wheel, said plurality of teeth being positioned around an entire circumference of said second wheel, said second wheel being rolled across the cake decoration whereby said second wheel is configured to perforate the cake decoration.

17. A cake decoration mold assembly comprising:
   a collapsible housing having a bottom wall and a perimeter wall coupled to and extending upwardly from a perimeter edge of said bottom wall, said perimeter wall of said collapsible housing having a front side being hingedly coupled to and extending between a front edge of each of a first lateral side and a second lateral side of said perimeter wall of said collapsible housing, said perimeter wall of said collapsible housing having a back side being hingedly coupled to and extending between a back edge of each of said first lateral and said second lateral sides of said perimeter wall of said collapsible housing, said bottom wall of said collapsible housing having a first portion and a second portion, a coupled edge of said first portion of said bottom wall being hingedly coupled to a bottom edge of said front side of said perimeter wall of said collapsible housing, a coupled edge of said second portion of said bottom wall being hingedly coupled to said bottom edge of said back side of said perimeter wall of said collapsible housing, said first and second portions of said bottom wall of said collapsible housing being positionable in a closed position having a free edge of said first portion of said bottom wall of said collapsible housing abutting a free edge of said second portion of said bottom wall of said collapsible housing such that each of said first and second portions of said bottom wall of said collapsible housing extends inwardly away from an associated one of said front and back sides of said perimeter wall of said collapsible housing, said first and second portions of said bottom wall of said collapsible housing being positionable in an open position such that an upper surface of each of said first and second portions of said bottom wall of said collapsible housing abuts an inside surface of an associated one of said front and back sides of said perimeter wall of said collapsible housing, said perimeter wall of said collapsible housing being positionable in a collapsed position after said first and second portions of said bottom wall of said collapsible housing are positioned in said open position, said inside surface of each of said front, back, first lateral and second lateral sides of said perimeter wall of said collapsible housing being positioned proximal to each other when said perimeter wall is positioned in said collapsed position whereby said collapsible housing is configured to be collapsed, said perimeter wall of said collapsible housing having a plurality of perforations extending therethrough whereby said perimeter wall of said collapsible housing is configured to allow air to flow through said collapsible housing;
   a plurality of spaced grooves extending downwardly from a top edge of each of said first and second lateral sides of said perimeter wall of said collapsible housing, said spaced grooves being spaced laterally apart from each other along said top edge of each of said first and second lateral sides of said perimeter wall of said collapsible housing;
   a tab coupled to and extending upwardly from a top edge of said perimeter wall, said tab being one of a plurality of tabs, said plurality of tabs comprising a pair of sets of said tabs, a first set of said tabs being coupled to and extending upwardly from a top edge of said front side of said perimeter wall of said collapsible housing proximal an associated one of said first and second lateral sides said perimeter wall of said collapsible housing, a second set of said tabs being coupled to and extending upwardly from a top edge of said back side of said perimeter wall of said collapsible housing proximal an associated one of said first and second lateral sides of said perimeter wall of said collapsible housing;
   a slot extending upwardly into said bottom edge of said perimeter wall of said collapsible housing, said slot being one of a plurality of slots, said plurality of slots comprising a pair of sets of said slots, a first set of said slots extending upwardly into said bottom edge of said front side of said perimeter wall of said housing proximal an associated one of said first and second lateral sides of said perimeter wall of said collapsible housing, a second set of said slots extending upwardly into said bottom edge of said back side of said perimeter wall of said collapsible housing proximal an associated one of said first and second lateral sides of said perimeter wall of said collapsible housing, said collapsible housing being one of a pair of collapsible housings, a second one of said collapsible housings being positionable on a top of a first one of said collapsible housings such that said plurality of slots in said second collapsible housing insertably receives an associated one of said plurality of tabs of said first collapsible housing whereby said first and second collapsible housings are configured to be vertically stacked;
   a shaft having a first end and a second end, each of said first and second ends having a diameter being less than a diameter of a middle portion of said shaft, said shaft being positionable in said collapsible housing having each of said first and second ends positioned within an associated one of said spaced grooves in said first and second lateral sides of said perimeter wall of said collapsible housing such that said shaft extends between said first and second lateral sides of said perimeter wall of said collapsible housing, said shaft having a shaped cake decoration positioned on said shaft whereby said shaft is configured to dry the shaped cake decoration, said shaft being one of a plurality of shafts, said plurality of shafts comprising a pair of sets of said shafts, an outer surface of said middle portion of a first set of said shafts having a diameter being greater than a diameter of an outer surface of said middle portion of a second set of said shafts;
   a roller being one of a pair of rollers, a first one of said rollers having a textured outer surface whereby said first roller is configured to texture the cake decoration when said first roller is rolled across the cake decoration, a second one of said rollers having a smooth outer surface whereby said second roller is configured to flatten the cake decoration when said second roller is rolled over the cake decoration;

a hook being selectively coupled to said collapsible housing having a coupling end of said hook being extended through a selected one of said perforations whereby said hook is retained on said collapsible housing, said hook being one of a plurality of said hooks, each of said plurality of hooks insertably receiving an associated one of a first end and a second end of said shaft whereby said hooks are configured to store said shaft;

a marking tool having a first end and a second end;

a first wheel rotatably coupled to said first end of said marking tool, said first wheel being rolled across the cake decoration whereby said first wheel is configured to cut the cake decoration; and a second wheel rotatably coupled to said second end of said marking tool, said second wheel having a plurality of teeth coupled to and extending away from an outer edge of said second wheel, said plurality of teeth being positioned around an entire circumference of said second wheel, said second wheel being rolled across the cake decoration whereby said second wheel is configured to perforate the cake decoration.

* * * * *